(12) United States Patent
Rentzsch

(10) Patent No.: US 7,262,907 B2
(45) Date of Patent: Aug. 28, 2007

(54) MICROSCOPE AND METHOD FOR OPERATING A MICROSCOPE

(75) Inventor: Wolfgang Rentzsch, Wetzlar (DE)

(73) Assignee: Leica Microsystems CMS GmbH, Wetzlar (DE)

(*) Notice: Subject to any disclaimer, the term of this patent is extended or adjusted under 35 U.S.C. 154(b) by 35 days.

(21) Appl. No.: 10/892,031

(22) Filed: Jul. 15, 2004

(65) Prior Publication Data
US 2005/0017153 A1    Jan. 27, 2005

(30) Foreign Application Priority Data
Jul. 16, 2003 (DE) ............... 103 32 468

(51) Int. Cl.
*G02B 21/00* (2006.01)
*G02B 21/06* (2006.01)

(52) U.S. Cl. ................ 359/368; 359/385

(58) Field of Classification Search .......... 359/368, 359/369, 385, 389
See application file for complete search history.

(56) References Cited

U.S. PATENT DOCUMENTS

| | | | |
|---|---|---|---|
| 5,867,308 A | 2/1999 | Pensel et al. | |
| 6,118,581 A | 9/2000 | Domanik et al. | 359/392 |
| 6,292,214 B1 | 9/2001 | Sakano et al. | |
| 6,452,625 B1 | 9/2002 | Kapitza | 348/80 |
| 2001/0045506 A1 | 11/2001 | Masuyama | |
| 2002/0118449 A1 | 8/2002 | Spink | 359/368 |
| 2002/0186178 A1 | 12/2002 | Kaufhold et al. | 345/7 |

FOREIGN PATENT DOCUMENTS

| | | |
|---|---|---|
| DE | 195 48 091 | 7/1996 |
| DE | 196 40 907 | 4/1997 |
| DE | 19637756 | 4/1997 |
| DE | 196 35 666 | 12/1997 |
| DE | 100 24 686 | 11/2001 |
| DE | 201 14 779 | 3/2002 |
| DE | 100 64 909 | 7/2002 |
| GB | 2212943 | 8/1989 |
| WO | WO-9813716 | 4/1998 |

OTHER PUBLICATIONS

Office Action in German Application No. 103 32 468, 4 pages (with brief English translation thereof, 3 pages).

*Primary Examiner*—Alessandro Amari
(74) *Attorney, Agent, or Firm*—Darby & Darby (57) ABSTRACT

A microscope includes an eyepiece, an illumination beam path for illuminating a specimen, and a detection beam path for imaging the specimen. A microscope operator interface is also provided, as well as an image overlay device for overlaying an image of the microscope operator interface onto the detection beam path so that the image of the microscope operator interface together with an image of the specimen is presented at the eyepiece. Also provided is at least one operating apparatus for interacting between the operator and the microscope operator interface.

11 Claims, 5 Drawing Sheets

MICROSCOPE AND METHOD FOR OPERATING A MICROSCOPE

Priority is claimed to German patent application 103 32 468.2, the subject matter of which is hereby incorporated by reference herein.

The present invention relates generally to microscopes, and particularly to a microscope having an eyepiece, an illumination beam path serving to illuminate a specimen, and a detection beam path that images the specimen, where an image of a microscope operator interface can be overlaid onto the detection beam path.

BACKGROUND

Microscopes having an eyepiece, an illumination beam path serving to illuminate a specimen, and a detection beam path that images the specimen have been known for some time in practical use. Several actuation elements, which are embodied, for example, in the form of rotary knobs with which a specimen in the focal plane can be positioned or focused, are provided on the microscope stand for microscope operation. A light source for specimen illumination can be switched on or off, for example, with a switch. A lever permits actuation of a filter slider with which different filters can be introduced into the illumination or detection beam path of the microscope.

Depending on the configuration of the microscope, individual operating functions, or all of them, can be motorized, so that the microscope is (remotely) operable, for example, by way of a computer connected to the microscope.

For an inexpert user, however, the operation of a microscope is anything but efficient and ergonomic. When beginning a specimen examination, a microscope operator usually looks through the eyepieces in order first to locate and adjust the specimen. In other words, he focuses the specimen and positions it in the focal plane in such a way that the specimen region of interest to him is imaged by the microscope objective into the eyepiece. The operator must, in this context, operate a plurality of actuation elements that are mounted at different points on the microscope stand. To reach them, he must often move his head and eyes away from the eyepieces and look in the direction of the operating elements so as then to be able to grasp and operate them with his hand. This is time-consuming, tiring, and not ergonomic. Incorrect operation of microscopes also regularly occurs, specifically with inexperienced microscope operators, because an incorrect lever is accidentally actuated, and the desired result is not thereby obtained. Even an experienced operator is often subject to operating errors, however, when he operates microscopes in a laboratory that are made by different manufacturers, or different microscope models or versions from the same manufacturer.

The arrangement on a microscope of the actuation elements known per se from the existing art is problematic in particular in ergonomic terms. For example, in almost all cases the three actuation elements are spaced too far apart from one another, so that after focusing the specimen, the operator's hand must be moved to the other two actuation elements in order to adjust the microscope stage in the X and Y directions. An unpracticed operator, in particular, must remove his eyes from the eyepieces for this purpose in order to see where the rotary knobs for the microscope stage are located, in order then to be able to grasp and actuate them with his hand. As a result, it is possible to work efficiently with the microscope only after a very long familiarization phase, i.e. when the operator can find and operate the actuation elements "blind."

SUMMARY OF THE INVENTION

It is therefore an object of the present invention to provide a microscope having an eyepiece, an illumination beam path serving to illuminate a specimen, and a detection beam path that images the specimen, whereby ergonomic, efficient, and simplified operation of the microscope is possible. A further object of the present invention is to provide an ergonomic, efficient, and simplified method for operating a microscope.

The present invention provides a microscope including: an eyepiece; an illumination beam path configured to illuminate a specimen; a detection beam path configured to image the specimen; an image overlay device configured to overlay an image of a microscope operator interface onto the detection beam path so that the image of the microscope operator interface together with an image of the specimen is presented at the eyepiece; and at least one operating apparatus configured to interact between an operator and the microscope operator interface.

What has been recognized in accordance with the present invention is the fact that providing a microscope operator interface, for example, in the eyepiece of the microscope, makes available to the user in advantageous fashion, on the one hand the specimen image in direct fashion, and on the other hand the microscope operator interface overlaid on the specimen image enables a simplified operation. An operator can thus, while examining the specimen (and without removing his eyes from the eyepieces), operate the microscope with the aid of the operating apparatus, which could be embodied e.g. in the form of a computer mouse, by interacting with the microscope operator interface via the operating apparatus. The interaction could be accomplished in such a way that a kind of mouse pointer, which is positionable in the microscope operator interface using the operating apparatus, is displayed to the operator in the microscope operator interface. By actuation of a pushbutton switch on the operating apparatus, for example, a specific microscope operating mode displayed in the microscope operator interface could then be selected and established by the motorized microscope. Even an inexperienced or inexpert microscope operator can thus operate the microscope efficiently and ergonomically with no need to remove his eyes from the eyepieces. Easy training can be achieved by way of an intuitive configuration of the microscope operator interface.

In an embodiment, the microscope encompasses a documentation port, the image of the microscope operator interface being capable of being generated together with the specimen image at the documentation port. A camera, preferably in the form of a CCD camera or video camera, could, for example, be attachable to the documentation port. If provision is made for such a camera, with which the specimen image together with the image of the microscope operator interface is recorded in order to display the overlaid images on a computer monitor or video monitor, then on the one hand complete remote control of the microscope according to the present invention is possible, since the user need not look with his eyes into the microscope eyepieces. On the other hand, if the displayed image sequences are stored appropriately, the operating parameters of the microscope during specimen detection can be documented.

An image of this kind of a microscope operator interface could, for example, be generated by means of an LCD or TFT display, provision being made for reflecting or coupling in the image at a suitable point in the beam path of the microscope, preferably at a plane corresponding to the intermediate plane of the detection beam path. The LCD or TFT display could be embodied in backlit or transparent fashion, and in the latter case transilluminated by light of a light source. With such an embodiment of the microscope according to the present invention, the operator can adjust all the operating parameters of the microscope, and operate the microscope, without having to remove his eyes from the eyepiece. Simple, direct, and very efficient microscope operation is thereby made possible in an advantageous fashion.

In an embodiment, the microscope operator interface comprises a menu interface, symbols, and/or icons that is/are selectable, for example via crosshairs, a cursor, or a mouse pointer, by means of the operating apparatus, in a manner comparable to a computer mouse in the case of a computer.

The image of the microscope operator interface could be blocked out when the operating apparatus is not used by the operator for a time longer than a definable period. The principal purpose of this feature is to prevent interference with specimen detection (especially in the case of light-sensitive fluorescent light detection) or specimen image display. The image of the microscope operator interface could also be switched off upon an instruction from the operator of the microscope.

A system regulating the brightness of the specimen image and/or of the image of the microscope operator interface is preferably provided, so that overillumination of the one image with respect to the other can be counteracted. The brightness regulation is preferably automatically executable, or adjustable by the operator on the operating apparatus.

In an embodiment, the operating apparatus is provided for the adjustment of operational parameters of the microscope, and encompasses a touchpad, a touch screen, a computer mouse, and/or a trackball, preferably comprising at least one pushbutton switch and/or an adjusting wheel. This computer mouse could be, in this context, a conventional, commercially available computer mouse.

In another embodiment, the operating apparatus is provided for the adjustment of operational parameters of the microscope and comprises an operating element that comprises at least two actuation elements each arranged rotatably about an axis, the axes of the actuation elements being arranged substantially vertically in the operational position, the two actuation elements being arranged vertically one below another, and a further actuation element being provided which is arranged rotatably about a further axis and whose axis is arranged substantially vertically or horizontally in the operational position.

Operating elements of this kind are used in particular in microscopes having a mechanically driven microscope stage, and are arranged directly on the microscope stage. With an operating element of this kind, the position of a microscope stage, or of a specimen slide located on a microscope stage, is adjustable in the X and Y directions. An operating element of this kind usually encompasses two rotary knobs or actuation elements that are arranged vertically one below another, their rotation axes being arranged coaxially. The specimen can be positioned in the one direction using the upper rotary knob on the microscope stage, and in a direction perpendicular thereto using the lower rotary knob. The rotation of the actuation elements is transferred, in this context, by way of coaxially arranged shafts or hollow shafts to the mechanism of the microscope stage provided for execution of the microscope stage motions.

A rotatably arranged actuation element whose rotation axis is arranged substantially horizontally, and with which the microscope stage or the objective can be positioned along the optical axis, is usually provided on the microscope stand for focusing, i.e. for positioning of the specimen relative to the microscope objective along the optical axis.

It may be noted in general that this type of arrangement of the actuation elements on a conventional microscope is functionally sensible for an operator and easy to learn, since the two actuation elements arranged one below another are usually, for positioning of the microscope stage in the X or Y direction, have a rotation direction whose tangential component is arranged substantially in the same plane as the positioning device for the microscope stage. The actuation element serving for specimen focusing also has a rotation direction whose tangential component points, inter alia, in the vertical direction along which specimen focusing is ultimately performed.

In an embodiment, the spacing between the three actuation elements of the operating element is chosen in such a way that actuation of the three actuation elements of the operating element is possible simultaneously using one of an operator's hands. Actuation thereof using only one of an operator's hands is thus possible, without changing grip or laboriously positioning the hand on actuation elements located far away from one another. For example, one of the three actuation elements of the operating element according to the present invention can be operated with the thumb, and the other two actuation elements, in fact simultaneously, with the index and middle finger respectively. The operating element is thus ergonomically embodied in advantageous fashion, and it is possible to work efficiently with the microscope.

With this arrangement of the actuation elements, an operator who has hitherto worked with a microscope having only a mechanically driven microscope stage can, in advantageous fashion, also work without difficulty on the motorized microscope. Only a short period of familiarization (if any) is therefore necessary for microscope operation, so that microscope operation is advantageously easy to learn.

Very generally, however, the operating element is also usable for the operation of other units in which, for example, an object must be positioned in three dimensions. In this case the signal generated by the actuation elements would thus need to be transferred to a control device of the unit or directly to the unit, and the operating element could be configured physically separately from the unit.

The actuation elements are usually arranged directly on the microscope, so that actuation thereof, in some circumstances, transfers the operator's jerky movements to the microscope in the form of vibrations, thereby disadvantageously making successful specimen positioning difficult or indeed impossible. Specifically, when additional manipulators (e.g. for patch clamp applications) are adapted onto the microscope, the actuation elements provided on the microscope may be difficult or in fact impossible to access. In such cases, "remote control" of the microscope with an operating element mechanically decoupled from the microscope would be necessary.

A configuration of the operating apparatus physically separately from the microscope is therefore preferably provided, so that mechanically decoupled operation of a microscope is possible. Vibrations that are caused, for example, by jerky hand movements of a microscope operator and might be transferred to the microscope are thus advantageously, because of the mechanical decoupling, not transferred at all to the microscope. A signal that is rotation-dependent and transferable to the microscope can preferably be generated with the actuation elements of the operating apparatus or of the operating element.

For mechanical decoupling of the operating apparatus from the microscope, it is necessary for the "remotely controlled" components to be embodied in motorized or automated fashion. For example, either a microscope stage or a specimen slide holder on a microscope stage on the microscope could be embodied in motor-driven and thus remotely controllable fashion. Motor-driven positioning of the microscope stage or of the objective along the optical axis is also to be provided for. Automatic changing of the objectives could optionally be provided.

In an embodiment there is provided, between the two actuation elements of the operating element arranged one below another, a substantially horizontally arranged component on which the two actuation elements are rotatably arranged. This component could receive, in addition to corresponding bearings or mounting means for the actuation elements, lines through which the electrical signals generated by the actuation elements of the operating element can be transferred. The component could be mounted on a foot part of the operating element that could be embodied in box-shaped fashion or with an ergonomic design, and/or could have a rest or support for one of an operator's hands. Free accessibility of the actuation elements from almost all sides is guaranteed in particular when the actuation elements are rotatably arranged in isolation on a horizontally arranged component; this is helpful in terms of easy operation. The component could have a plate or could be embodied in the form of a plate.

In an embodiment, the further actuation element is rotatably arranged above the component and laterally offset with respect to the other two actuation elements. The further actuation element preferably has a different size, so that it is evident to an operator in both visual and tactile fashion that the further actuation element serves to adjust a different operating parameter of the microscope from the two actuation elements arranged one below another.

One actuation element of the operating element could comprise an adjusting knob or an adjusting wheel. The adjusting knob or adjusting wheel could have a substantially cylindrical or conical shape. A shape for an actuation element corresponding to an ellipsoid segment would also be conceivable.

The surface of an actuation element could be embodied in nonslip fashion; for example, it could have a knurled adjusting knob made of metal, or an adjusting wheel made of rubber.

In an embodiment, the two axes of the actuation elements of the operating element arranged one below another are arranged substantially coaxially. An arrangement comparable to the actuation elements of a conventional mechanically driven microscope stage thus exists, so that an operator of a conventional microscope can, advantageously, very quickly become familiar with microscope operation using the operating element. The diameters of the two actuation elements are preferably substantially the same.

The operating element may encompass at least one switch, which could be embodied in particular in the form of a pushbutton switch and/or a changeover switch. For example, two pushbutton switches could be provided with which the lamp brightness can be varied. One or two pushbutton switches could furthermore be provided with which, by means of an objective turret rotatable in motorized fashion, a different objective can be introduced into the microscope beam path. A pushbutton switch could also be provided that can effect a switchover between different operational modes of the microscope, for example from transmitted-light mode to fluorescence mode. The pushbutton switch or switches could be arranged on a foot part or on at least one of the actuation elements of the operating element.

The spacing between the three actuation elements and the switch is preferably chosen so that actuation of the three actuation elements and the switch is possible simultaneously using one of an operator's hands. This feature advantageously enables simple and efficient microscope operation.

Further signals serving for operation of a microscope can be generated with the operating apparatus if, for example, a substrate is provided on which the operating apparatus is movably arranged, and if a relative motion, commanded by an operator, between the operating apparatus and the substrate is executable with the operating apparatus. Based on this relative motion between the operating apparatus and the substrate, directional signals and/or position signals could be generated with which, for example, a motorized microscope stage could be controlled in comparable fashion in the X and/or Y direction. This type of microscope operation is comparable to an operator interaction that exists in the context of operation of a computer mouse. It is ultimately possible in this fashion to generate, with the operating apparatus, direction- and distance-related signals that are usable for microscope operation. The operator can preferably select between the various types of input, so that with the microscope stage, he can control a specimen in the X and/or Y direction either with the two actuation elements of the operating element arranged one below another, or by means of a relative motion between the operating apparatus and the substrate. This switchover could be accomplished using a pushbutton switch provided on the operating apparatus.

A relative motion as discussed above could preferably be executable using one of the operator's hands on the computer mouse. When the operator moves the computer mouse with his hand, the operating apparatus is thus also automatically moved as a result of the association between the computer mouse and the operating apparatus. A carrier plate may be provided on which are provided not only the actuation elements of the operating element but also a receptacle for the computer mouse.

For the case in which the operating apparatus comprises a trackball or a computer mouse, a means could be provided for activation or deactivation of a relative motion between the operating apparatus and the substrate, a mechanical or optical contact between the computer mouse and the substrate being interruptible with that means when the computer mouse is not being used by the operator.

The means for interrupting a mechanical contact between the computer mouse and the substrate could comprise a spring that at least partly lifts the computer mouse away from the substrate, so that the ball that partly protrudes from the housing on the underside of the computer mouse does not touch the substrate. If the operator then places his hand on the computer mouse, he thereby presses the computer mouse onto the substrate against the spring force of the spring, so that the ball is brought into contact with the substrate and signals concerning the relative motion between the operating apparatus and substrate can be generated.

If the computer mouse is embodied in the form of a so-called optical computer mouse, a means for interrupting an optical contact between the computer mouse and the substrate could be provided that comprises a shutter which can be introduced between the computer mouse and the substrate, so as to be stationary with respect to the computer mouse in its interruption position. The shutter could be activated and deactivated, for example, with the aid of a contact detector associated with the computer mouse.

An information exchange between the operating apparatus and a control unit associated with the microscope could occur by means of an electrical or optical connecting line. For example, a cable connection could be provided with which electrical signals can be transferred. For optical signal transfer, a flexible glass-fiber connection between the operating element and the control unit of the microscope would also be conceivable.

In an embodiment, however, an information exchange between the operating apparatus and a control unit or receiver unit associated with a microscope is accomplished by means of electromagnetic waves, in particular in the form of radio waves or infrared light. For example, the computer mouse mentioned above could be a so-called radio mouse or infrared mouse, i.e. one which transfers the electrical signals generated by it to a receiver unit by means of radio waves or infrared radiation. The transfer is preferably accomplished in accordance with an approved standard, in particular the Bluetooth standard. Standard components can thus be used for manufacture of an operating element or operating apparatus, so that the production costs of an operating element according to the present invention can advantageously be minimized.

Information exchange between the operating apparatus and a control unit associated with a microscope refers, in particular, to the signals generated by the operating apparatus. Signals can also, however, be transmitted from the control unit of the microscope to the operating apparatus, for example so that signal lamps arranged on the operating apparatus can be switched on and off as a function of the microscope's operational state.

The control unit or receiver unit processes the signals that are generated, generates open- and/or closed-loop control signals, and conveys them to corresponding positioning and/or control elements and/or actuators of the microscope. A control unit of this kind could comprise, for example, a single-board computer that has a CPU, a keyboard connector, a number pad connector, a graphics chip to drive a display, a hard-drive and floppy-disk controller, and standard interfaces, e.g. a serial, parallel, network, or modem interface, a CAN bus, USB, and/or FireWire. The control unit of a microscope generally does not require its own hard drive, however, since the operating system data and programs can all be stored in ROM-based fashion in the single-board computer. Data can be exchanged with external devices or computers, for example, via a USB interface or by way of a memory stick. Personal user profiles of each operator could be transferred to the microscope using, in particular, a memory stick.

The microscope preferably encompasses motorized and/or controllable assemblies and/or a control unit, which is/are integratable in particular into the microscope stand. The microscope according to the present invention could ultimately be configured for remote control, in which context the components to be remotely controlled must be embodied in motorized fashion. Suitable motorized microscope components are, in particular, a microscope stage, a motorized system for specimen positioning along the optical axis for focusing, a motorized objective switchover system, a motorized filter switchover system, and a motorized operational mode switchover system.

In an embodiment, the operating apparatus is reversibly mountable on the microscope. It is thus possible to provide for a microscope only one operating apparatus, with which the microscope can be operated both when the operating apparatus is mounted on the microscope and when it is removed from the microscope. As a result, in advantageous fashion, the actuation elements provided on the microscope for microscope operation are omitted, thereby achieving consistent microscope operation for an operator and moreover a reduction in manufacturing costs. The operating apparatus is preferably attachable to the microscope by means of a clamp or catch connection, which could be comparable to the connection of a mobile telephone to a hands-free speaker device.

In the microscope-mounted state in particular, provision is made for an exchange of information and/or power between the operating apparatus and microscope by means of electrical contacts. For example, rechargeable batteries that are optionally provided could be charged in the microscope-mounted state. The batteries could serve to power a transmission unit of the operating apparatus for information transfer between the microscope and operating apparatus when the latter is removed from the microscope.

Remote control of the microscope according to the present invention in a context of telemicroscopy is also conceivable, specifically in that a control unit of the microscope is connectable via a computer network or a satellite link to a computer or operator terminal located at a great distance, both the microscope and the remotely located computer or operator terminal being respectively equipped with an operating apparatus. An operator present at the remotely located computer can thereby, in advantageous fashion, intuitively and realistically control the microscope using the operating apparatus.

In an embodiment, the microscope according to the present invention encompasses a display unit arranged on the microscope stand. The display unit can display a microscope operator interface with which the motorized or automated components of the microscope can be operated. The display unit comprises, in particular, a liquid crystal device (LCD) display or TFT display. This display could be embodied for direct operation in the form of a touch screen, so that an operator can command microscope operation via the display by touching it with a finger. In a preferred fashion, the display unit is embodied to be removable from the microscope, so that in the state removed from the microscope, the display unit can be placed next to the operating apparatus. Assuming appropriate automation and modularization of the microscope, complete remote control of the microscope is thus possible.

The present invention also provides a method for operating a microscope wherein a specimen positioning relative to a microscope objective of a microscope is commanded by the operator by means of the operating apparatus.

Various procedures for doing so are conceivable. For a specimen positioning action, a direction and a distance by which the specimen is to be positioned along the direction are generated using the operating apparatus.

In one procedure, a crosshairs or a mouse pointer is displayed on the display unit of the microscope or in the image of a microscope operator interface. By execution of a relative motion between the operating apparatus and a substrate, the crosshairs or mouse pointer can be positioned in the image made available to the operator. Microscope stage motions in the X and Y directions are activated by holding down a switch on the operating apparatus or a mouse button of a computer mouse of the operating apparatus, the relative motions between the operating apparatus and substrate as the mouse button is held down being converted into signals that correspond to the specimen positioning direction and distance desired by the operator. An almost simultaneous microscope stage motion is executed, the respective current microscopic image of the specimen being displayed to the microscope operator.

In a second procedure, only a border is displayed in the image made available to the microscope operator. If the crosshairs or mouse pointer is then positioned, using the operating apparatus, in such a way that it comes in contact with the border, the microscope stage motion is activated. With this so-called crosshairs motion beyond the displayed border as well, the direction and distance of the specimen positioning action to be performed are once again generated on the basis of the relative motion between operating apparatus and substrate. The microscope stage is controlled directly, and the respective specimen image is displayed to the microscope operator during specimen positioning.

According to a third procedure, so-called scroll bars or slide controllers, such as those common in computer programs, are displayed for specimen positioning on the display unit or on the image of the microscope operator interface. By clicking on and displacing an appropriate click box of a scroll bar, it is possible to generate specimen positioning signals for direction and distance. In this mode as well, the respective specimen image is displayed during specimen positioning.

BRIEF DESCRIPTION OF THE DRAWINGS

There are various ways of advantageously embodying and refining the teaching of the present invention. The reader is referred, for that purpose, on the one hand to the claims subordinate to claim 1, and on the other hand to the explanation below of the preferred exemplary embodiments of the invention with reference to the drawings. In conjunction with the explanation of the preferred exemplary embodiments of the invention with reference to the drawings, an explanation is also given of generally preferred embodiments and refinements of the teaching. In the schematically depicted drawings:

DETAILED DESCRIPTION

Figure 1:
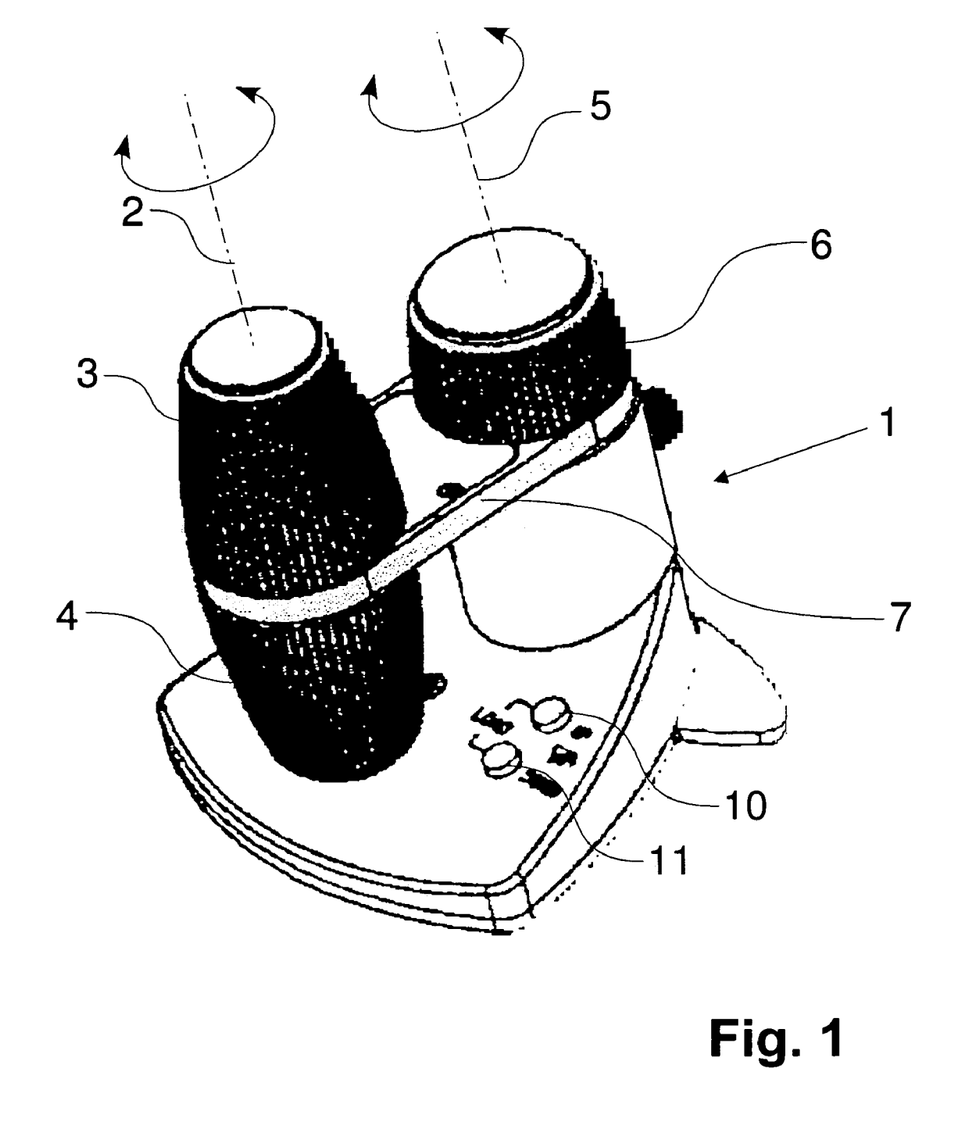
FIG. 1 is a perspective view of an exemplary embodiment of an operating apparatus.
Figure 2:
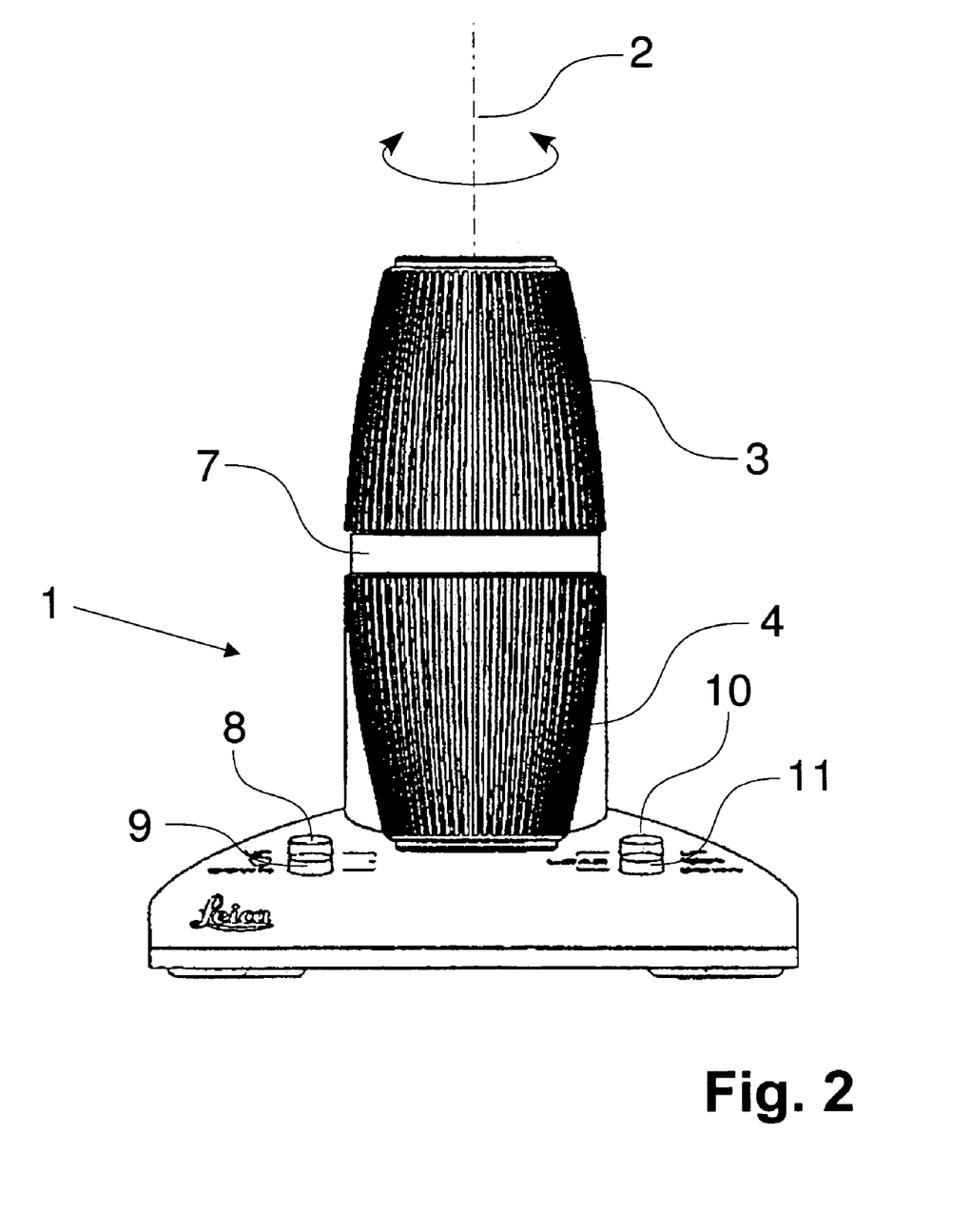
FIG. 2 is a front view of the operating apparatus of FIG. 1.

FIGS. 1 and 2 show an operating apparatus 1 for the adjustment of operational parameters of a microscope, identical components being labeled with identical reference characters. Operating apparatus 1 encompasses two actuation elements 3, 4 each arranged rotatably about an axis 2. Since the axes of the rotatably arranged actuation elements 3, 4 are arranged coaxially, only one axis 2 is shown in FIG. 1. Axis 2 is arranged substantially vertically when the operating element is in the operational position, as is evident from FIG. 2. The two actuation elements 3, 4, are arranged vertically one below another. A further actuation element 6, arranged rotatably about a further axis 5, is provided, its axis 5 likewise being arranged substantially vertically in the operational position. The rotation directions of actuation elements 3, 4, 6 about axes 2, 5 are indicated by the double arrows.

Operating apparatus 1 is configured physically separately from a microscope. With actuation elements 3, 4, and 6, a signal dependent on rotation can be generated and can be transmitted to a microscope. The spacing between the three actuation elements 3, 4, 6 is chosen in such a way that actuation of the three actuation elements 3, 4, 6 is possible simultaneously using one of an operator's hands.

With actuation elements 3, 4, 6 of operating apparatus 1, on the one hand specimen positioning in the focal plane is achieved by way of an actuation of actuation elements 3, 4, the specimen being positionable in the X direction using actuation element 3, and in the Y direction using actuation element 4. The two actuation elements 3, 4 are arranged analogously to actuation elements that are provided on conventional mechanically actuatable microscope stages. A positioning of the specimen relative to the microscope objective along the optical axis is performed with actuation element 6.

Provided between the two actuation elements 3, 4 arranged one below another is a substantially horizontally arranged component 7 on which the three actuation elements 3, 4, 6 are arranged rotatably. Component 7 is substantially in the form of a plate.

Further actuation element 6 is rotatably arranged above component 7 and laterally offset with respect to the other two actuation elements 3, 4.

Actuation elements 3, 4, 6 are each embodied in the form of an adjusting knob, and have a substantially cylindrical but slightly conically tapering shape. The surface of actuation elements 3, 4, 6 is embodied with gripping flutes so that substantially slip-free actuation is possible. The diameters of the two actuation elements 3, 4 are identical.

Operating apparatus 1 encompasses four switches 8 through 11 that are embodied in the form of pushbutton switches. The spacing between the three actuation elements 3, 4, 6 and switches 8 through 11 is chosen in such a way that an actuation of the three actuation elements 3, 4, 6 and of switches 8 through 11 is possible simultaneously using one of the operator's hands. Switches 8 and 9 serve respectively to reduce and increase the microscope lamp brightness. Switches 10 and 11 serve to change the microscope objective.

Figure 3:
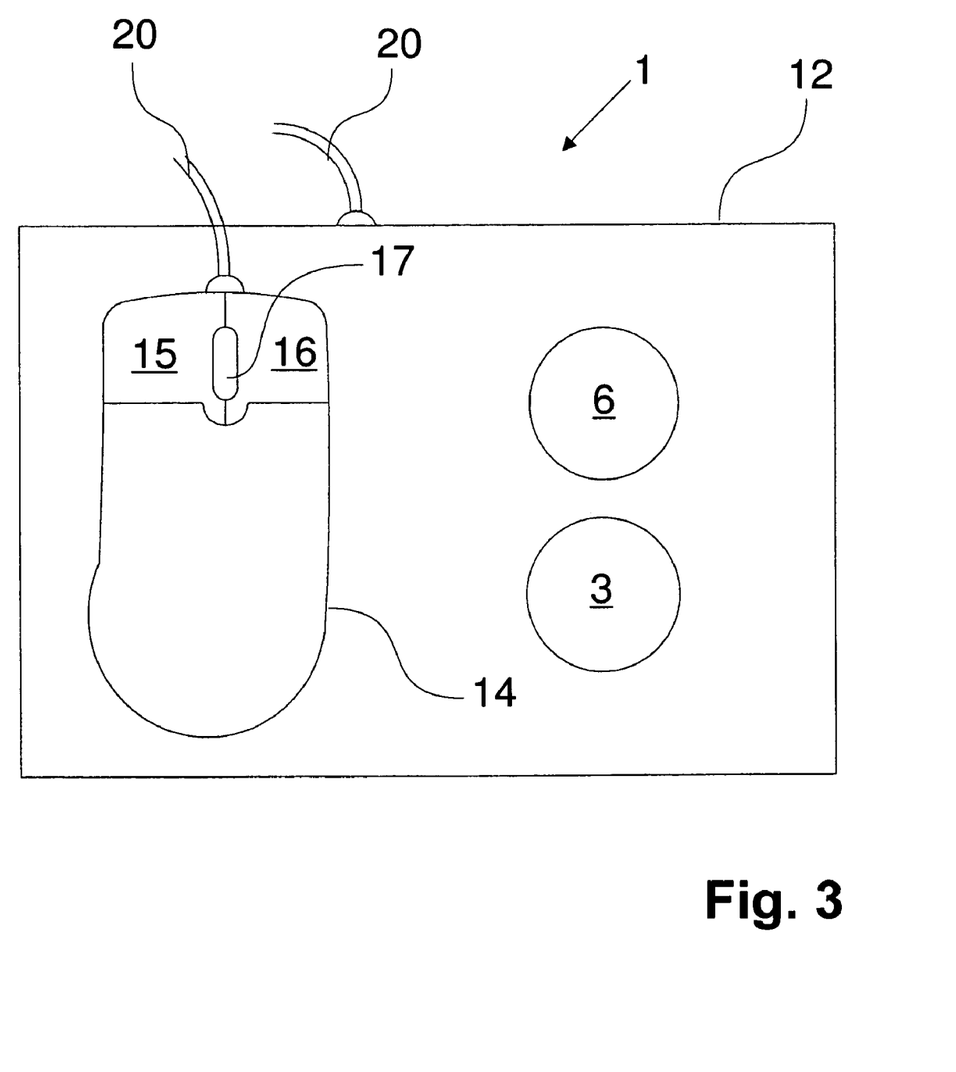
FIG. 3 is a plan view of a second exemplary embodiment of an operating apparatus.
Figure 4:
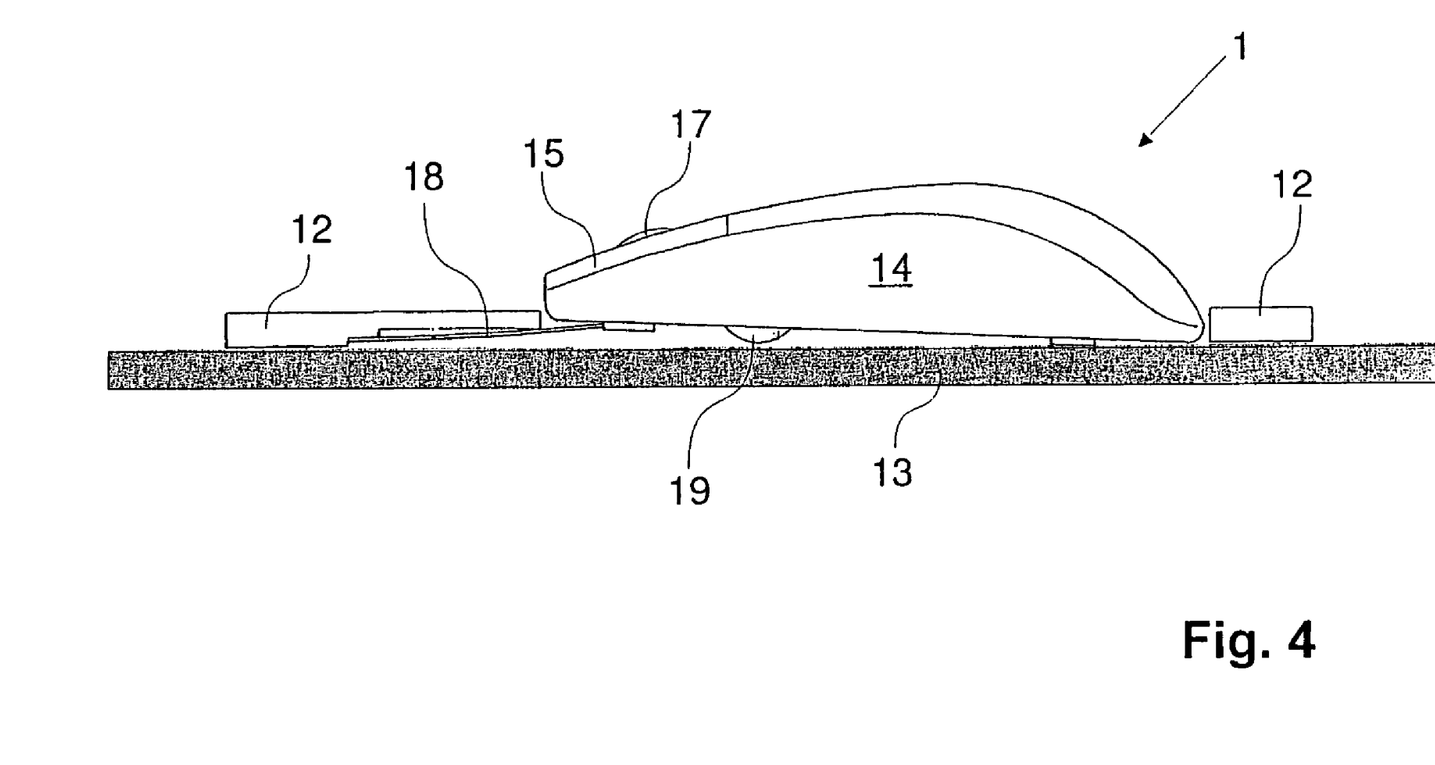
FIG. 4 is a side view of the operating apparatus of FIG. 3.

FIGS. 3 and 4 show a further exemplary embodiment of an operating apparatus 1, only actuation elements 3 and 6 being shown in the plan view of FIG. 3. Actuation element 4 arranged below actuation element 3, as in FIG. 2. Operating apparatus 1 shown in FIGS. 3 and 4 encompasses a carrier plate 12 on which actuation elements 3, 4, 6 are arranged.

FIG. 4 shows that a substrate 13 is provided on which operating apparatus 1 is movably arranged. As a result of a relative motion between operating apparatus 1 and substrate 13 initiated by an operator, directional signals and/or position signals can be generated with which, for example, a microscope stage of a microscope can be controlled.

Operating apparatus 1 of FIGS. 3 and 4 encompasses a computer mouse 14 that comprises two pushbutton switches 15, 16 and an adjusting wheel 17. A relative motion between operating apparatus 1 and substrate 13 can be executed using one of the operator's hand on computer mouse 14, the entire operating apparatus 1 being moved, together with carrier plate 12, relative to substrate 13.

FIG. 4 shows that a means 18 in the form of a spring plate is provided with which a mechanical contact between ball 19 of computer mouse 14 and substrate 13 can be interrupted when computer mouse 14 is not being used by the operator. Means 18 for interrupting mechanical contact between computer mouse 14 and substrate 13 acts in such a way that computer mouse 14 is lifted partially away from substrate 13 when the operator does not have his hand placed on computer mouse 14, so that ball 19 is not moved in the event of an inadvertent relative motion between operating apparatus 1 and substrate 13.

FIG. 3 indicates that an information exchange between operating apparatus 1 and a control unit associated with a microscope takes place by means of an electrical connecting line 20.

Figure 5:
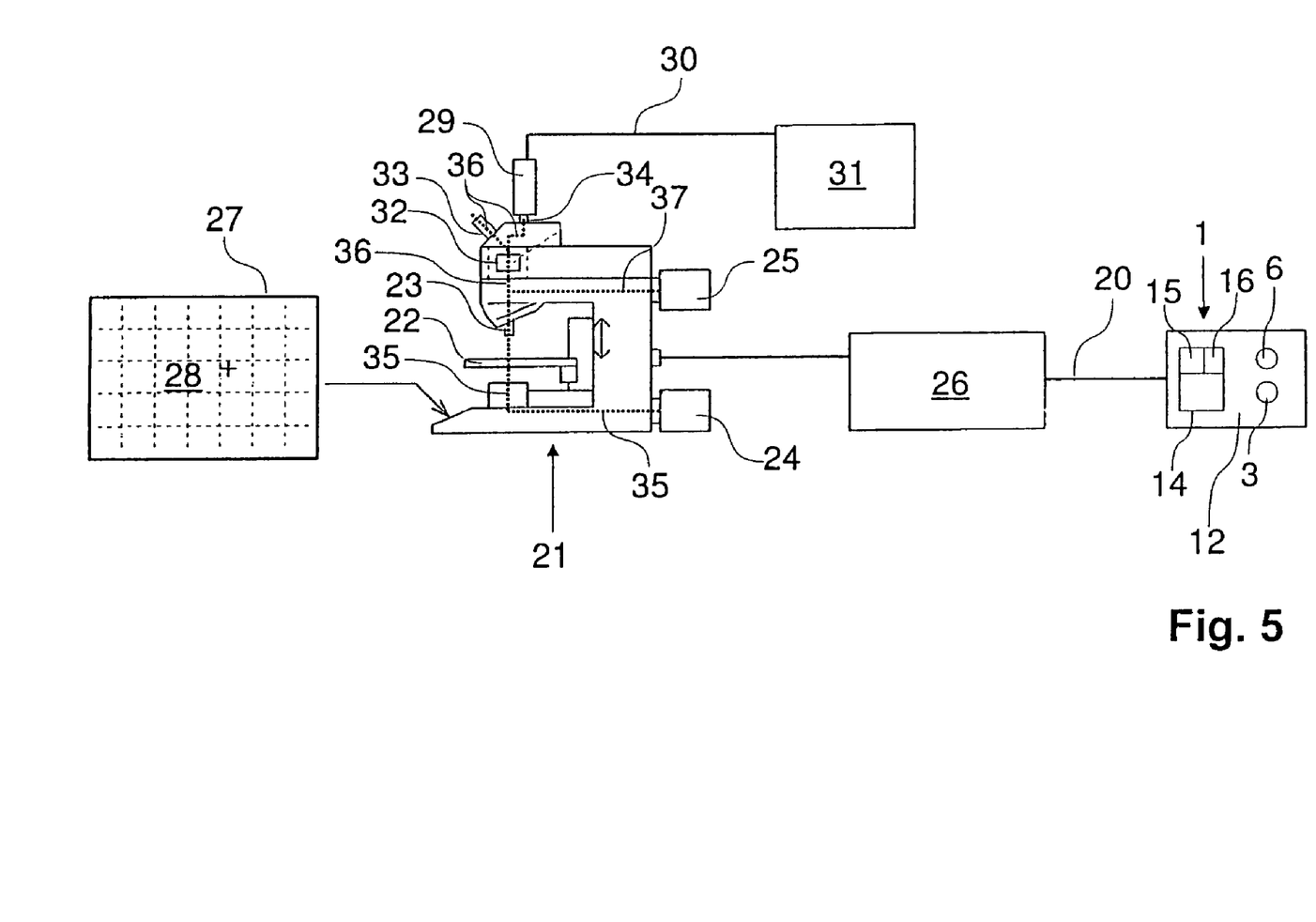
FIG. 5 shows an exemplary embodiment of a microscope according to the present invention.

FIG. 5 shows a microscope 21 according to the present invention that can be operated with an operating apparatus 1. Microscope 21 encompasses a motorized microscope stage 22 that is positionable in motor-controlled fashion in the X, Y, and Z directions. Microscope objectives 23 can furthermore be changed in motor-controlled fashion. Microscope 21 further encompasses a lamp housing 24 that provides transmitted-light illumination and a lamp housing 25 that provides incident-light illumination, for example in fluorescence mode. The operational modes of microscope 21 can also be adjusted or switched over in remotely controlled fashion.

In the transmitted-light mode of microscope 21, illumination beam path 35 extends from lamp housing 24 to the specimen on microscope stage 22. In this mode, detection beam path 36 extends from the specimen to eyepiece 33 or to video camera 29. Illumination beam path 37 for the incident-light mode of microscope 21 extends from lamp housing 25 to the specimen on microscope stage 22. Detection beam path 36 for this mode is substantially identical to that for the transmitted-light mode, and is optionally distinguished by different filters arranged in the beam path.

Solely for better clarity, control unit 26 is shown as an external unit, control unit 26 being integratable into the microscope stand. Operating apparatus 1 transmits the signals generated by actuation elements 3, 4, 6, 15, and 16 via connecting line 20 to control unit 26. Control unit 26 processes the signals generated by operating apparatus 1 and generates control signals with which, for example, microscope stage 22 is controlled.

A display unit 27, with which a microscope operator interface 28 can be displayed, is provided on the microscope stand of microscope 21. Display unit 27 encompasses a TFT display and, solely for greater clarity in depiction, is shown in FIG. 5 in a plan view, in enlarged fashion, in its operating state removable from microscope 21. A video camera 29, whose image signals are transmitted via connecting line 30 to video monitor 31, is also adapted on microscope 21.

An overlay device 32 overlays an image of a microscope operator interface 28 onto the detection beam path of microscope 21 so that the image of the microscope operator interface can be generated together with the specimen image at microscope eyepiece 33 and at documentation port 34 of microscope 21. Overlay device 32 may be, for example, a transparent LCD display that generates the image of microscope operator interface 28 and is positioned in the detection beam path 36 at the position of an intermediate plane of the detection beam path 36. The detection light coming from the microscope objective 23 transmits the transparent LCD except on those locations of the transparent LCD that represent the microscope operator interface 28. Alternatively, overlay device 32 may include a beam splitter, partial mirror or a glass plate positioned in the detection beam path 36 at the position of the intermediate plane of the detection beam path 36, onto which a back TFT display could project the microscope operator interface 28 and thereby generate the overlay.

In conclusion, be it noted very particularly that the exemplary embodiments discussed above serve merely to describe the teaching claimed, but do not limit it to the exemplary embodiments.

PARTS LIST

1 Operating apparatus
2 Axis of (3) and (4)
3 Actuation element
4 Actuation element
5 Axis of (6)
6 Further actuation element
7 Horizontally arranged component
8-11 Switches
12 Carrier plate
13 Substrate
14 Computer mouse
15 Left pushbutton switch of (14)
16 Right pushbutton switch of (14)
17 Adjusting wheel of (14)
18 Means for lifting (14)
19 Ball of (14)
20 Electrical connecting line of (1)
21 Microscope
22 Motorized microscope stage
23 Microscope objective
24 Lamp housing
25 Lamp housing
26 Control unit
27 Display unit
28 Microscope operator interface
29 Video camera
30 Connecting line between (29) and (31)
31 Video monitor
32 Lateral superimposition of image of (28)
33 Microscope eyepiece
34 Documentation port
35 Illumination beam path in transmitted-light mode
36 Detection beam path in transmitted-light and incident-light mode
37 Illumination beam path in incident-light mode

What is claimed is:

1. A microscope comprising;
an eyepiece;
an illumination beam path configured to illuminate a specimen;
a detection beam path configured to image the specimen;
an image overlay device configured to overlay an image of a microscope operator interface onto the detection beam path so that the image of the microscope operator, interface together with an image of the specimen is presented at the eyepiece; and
at least one operating apparatus configured to interact between an operator and the microscope operator interface
wherein the at least one operating apparatus is configured to adjust operational parameters of the microscope, the at least one operating apparatus including an operating element including at least a first, a second and a third actuation element, the first and second actuation elements being each rotatable about a first and a second respective axis, each respective axis being disposed substantially vertically in an operational position, the first and second actuation elements being disposed vertically one below another, the third actuation element being rotatable about a third axis disposed substantially vertically or horizontally in the operational position.

2. The microscope as recited in claim 1 wherein the first, second and third actuation elements are disposed relative to each other so that actuation of each of the actuation elements is simultaneously performable using one hand of the operator.

3. The microscope as recited in claim 1 wherein the operating element is disposed separate from the microscope and wherein at least one of the actuation elements is capable of generating a signal that is rotation-dependent and transferable to the microscope.

4. The microscope as recited in claim 1 further comprising a substantially horizontally arranged component disposed between the first and second actuation elements, the first and second actuation elements being rotatable on the component.

5. The microscope as recited in claim 4 wherein the component is a plate.

6. The microscope as recited in claim 4 wherein the third actuation element is rotatably disposed above the component and laterally offset with respect to the first and second actuation elements.

7. The microscope as recited in claim 6 wherein at least one of the adjusting knob and the adjusting wheel includes at least one of a substantially cylindrical shape, a substantially conical shape and a nonslip surface.

8. The microscope as recited in claim 1 wherein at least one of the first, second and third actuation elements includes at least one of an adjusting knob and an adjusting wheel.

9. The microscope as recited in claim 1 wherein the first and second axes are substantially coaxial and a diameter of the first actuation element is substantially the same as a respective diameter of the second actuation element.

10. The microscope as recited in claim 1 wherein the operating element includes at least one switch, the first, second and third actuation elements and the switch being disposed relative to each other so that actuation of each of the actuation elements and of the switch is simultaneously performable using one hand of the operator.

11. The microscope as recited in claim 10 wherein switch includes at least one of a pushbutton switch and a changeover switch.

* * * * *